United States Patent

[11] 3,581,118

| [72] | Inventor | Robert Van Zurk<br>Meylan, France |
|---|---|---|
| [21] | Appl. No. | 737,765 |
| [22] | Filed | June 17, 1968 |
| [45] | Patented | May 25, 1971 |
| [73] | Assignee | Commissariat A L'Energie Atomique<br>Paris, France |
| [32] | Priority | June 21, 1967 |
| [33] | | France |
| [31] | | 111,389 |

[54] METHOD OF PULSE SHAPING AND RENEWABLE DURATION VARIABLE PULSE-SHAPING CIRCUIT FOR THE APPLICATION OF SAID METHOD
10 Claims, 11 Drawing Figs.

[52] U.S. Cl. .................................................. 307/267,
235/92, 250/71.5, 307/265, 328/48
[51] Int. Cl. .................................................. H03k 1/18
[50] Field of Search.......................................... 307/224,
225, 265, 267, 234; 328/43, 48, 120; 235/92;
250/71.5, 83.3

[56] References Cited
UNITED STATES PATENTS

| 2,519,184 | 8/1950 | Grosdorf | 328/48 |
| 2,560,968 | 7/1951 | MacSorley | 328/48 |
| 2,941,152 | 6/1960 | Gosslau | 328/48 |
| 3,369,183 | 2/1968 | Mester | 328/48 |
| 3,426,296 | 2/1969 | Christiansen et al. | 328/48X |

Primary Examiner—Donald D. Forrer
Assistant Examiner—R. C. Woodbridge
Attorney—Craig, Antonelli, Stewart & Hill ABSTRACT: A method of pulse shaping and an electronic assembly for carrying out said method whereby incident pulses are transmitted to a counter in order to reset said counter to zero, and whereby the resultant signal is recycled, the operation is continued as long as the counter has not recorded a predetermined number and the successive pulses produced by the generator are converted to a single wide pulse. The assembly comprises a counter which has a plurality ($n$) of flip-flops, an element for resetting the counter to zero and coupled to the input of the assembly, a logic circuit whose inputs are coupled to each flip-flop of the counter, a pulse generator controlled by the logic circuit as well as a zero-overlap variable shaping device which follows said pulse generator and is coupled to the input of the counter as well as to the output of the assembly.

INVENTOR
ROBERT VAN ZURK

BY Craig & Antonelli
ATTORNEYS

METHOD OF PULSE SHAPING AND RENEWABLE DURATION VARIABLE PULSE-SHAPING CIRCUIT FOR THE APPLICATION OF SAID METHOD

The present invention relates to a method of pulse shaping and to a renewable duration variable pulse-shaping circuit for carrying out said method, said circuit having potential applications in the 100-nanosecond range.

When a circuit of this type receives, after a first pulse $i_1$, a second pulse $i_2$ which is separated from the first by a time interval $\delta$ which is longer than the resolving time ($\tau$) of the circuit but shorter than a predetermined duration $\Delta (\tau < \delta < \Delta)$, said circuit produces a pulse corresponding to the two incident pulses whose duration $D$ is the sum of the duration of the time interval $\delta$ and of said predetermined duration $\Delta$ ($D = \delta + \Delta$).

This type of circuit produces a pulse having a duration $\Delta$ each time it receives an incident pulse $i$ if a time duration greater than $\Delta$ has elapsed since the former incident pulse and if said pulse is not followed by another pulse which is separated from the first by a time interval having a duration shorter than $\Delta$.

Devices of this type are known and have already been constructed. In particular, they are described in two articles published in the review entitled "Nuclear instruments and methods":

a. "Multiple-duration monostable multivibrator" by S. Gorodetzky, J. Zen, J. Ruscher, A. Muser, R. Armbruster, 40—1966, pages 89—92, as well as b. "The influence of different pulse formers on the efficiency of anticoincidence gates" by P. Polly, 49—1967, pages 341—345.

Unfortunately, the devices which are described in these articles cannot be employed at high mean frequencies.

The pulse-shaping method according to the invention is not subject to this drawback and can be applied to the construction of circuits which are utilizable over a wide range of time intervals comprised between a few tens of nanoseconds and a few microseconds. In addition, said circuits can be employed in the construction of anticoincidence assemblies of high efficiency or of antipileup devices.

The method of variable pulse shaping in accordance with the invention consists in carrying out the following operations:

a. transmitting the incident pulses to a scaler for resetting said counter to zero;

b. recycling the signal which results from this operation, c. continuing this operation as long as the counter has not registered a predetermined number, and d. converting to a single wide pulse the successive pulses which are produced by the generator.

The invention is also directed to a device for the practical application of the method referred to above, said device being characterized in that the input terminal is connected to the zero-resetting element of a counter comprising a plurality of flip-flops each coupled to the inputs of a logic circuit which controls a periodic pulse generator. Said generator is followed by a variable pulse-shaping device with zero overlap time and is connected to the input of the counter. Said shaping circuit produce the output signals.

In order to prevent disturbances which might result from the resetting of the counter while the switching operations take place within this latter, the incident pulses which are applied to the input terminal of the apparatus are not applied directly to the reset input of the counter. Said pulses trigger a monostable multivibrator which is followed by a delay device (duration $p/2$); the pulses transmitted by said delay device serve to trigger a monostable multivibrator which is coupled with the reset input of said counter. Finally, the monostable multivibrator blocks a normally conducting gate which connects the pulse generator to the input of the counter. It should be noted that the time $p$ of closure of the gate is double the time delay $p/2$ introduced by the device which is associated in series with the monostable multivibrator.

The pulses produced by the shaping circuit are transmitted to a smoothing circuit whereby the successive pulses of the generator are converted to a single pulse after shaping. In this case, the variable pulse-shaping circuit produces rectangular pulses having a duration $\theta$ which is shorter than the pulse repetition period $\lambda$ of the pulse generator.

The pulses which are returned to the input of the counter must be short, so that an auxiliary shaping element may be provided which receives the rectangular pulses and produces short pulses which drive the counter.

In order to trigger the generator when an input pulse is transmitted to the input terminal and when all the flip-flops are not in state "1," use is made of an integrator to which is applied the voltage appearing at the output of the flip-flop of the counter and which initiates the operation of said generator when the amplitude of the output voltage of said integrator oversteps a predetermined threshold.

Finally, it is important to prevent untimely transmissions of trigger pulses from the integrator to the periodic pulse generator. Accordingly, a feedback channel couples the smoothing circuit with the integrator. This channel has the function of inhibiting the operation of the integrator when the smoothing circuit produces an output pulse.

It is an object of the invention to provide an improved renewable duration pulse-forming circuit, that is a circuit which delivers a rectangular pulse of predetermined time duration when it receives an input pulse, the time duration being lengthened if another input pulse is received before the end of the rectangular pulse by an amount equal to said predetermined duration from the time of occurrence of said another input pulse.

In order that the technical characteristics as well as the different advantages of the present invention may become more readily apparent, the operation of a renewable duration pulse-shaping circuit and one example of construction will now be described, it being understood that this example does not imply an limitation either in the modes of execution or the potential applications thereof.

Figure 1:
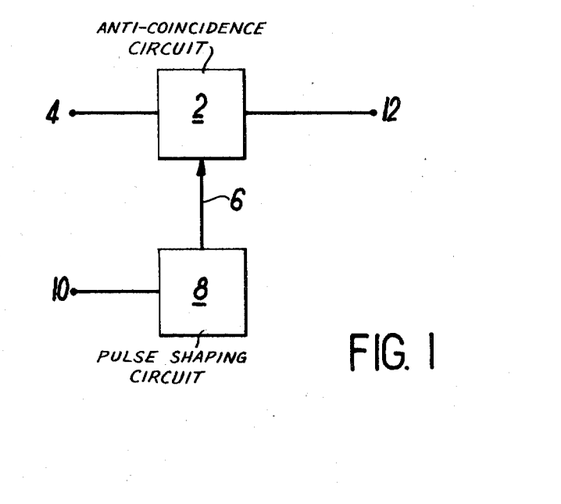
FIG. 1 shows an anticoincidence circuit arrangement which makes use of a pulse-shaping circuit.

In the following description, reference will first be made to the operation of an anticoincidence circuit 2 (as shown in FIG. 1) to which an input signal is directly applied at 4 and which is driven at its second input 6 by the signal produced by a shaping device 8 which receives the signals at its input 10.

Three cases will be considered in turn:

a. The shaping device 8 is of conventional design, the dead time $\rho$ being equal to double the duration $\sigma$ of the signal produced (lines A, FIG. 2).
b. The shaping device is of an improved design in which the dead time $\rho$ is equal to the duration $\sigma$ of the signal produced (lines B, FIG. 2).
c. The shaping device is of the renewable duration design, the dead time which is again equal to the duration of the signal $\sigma$ produced being of considerably greater magnitude than the resolving time (lines C, FIG. 2).

Figure 2:
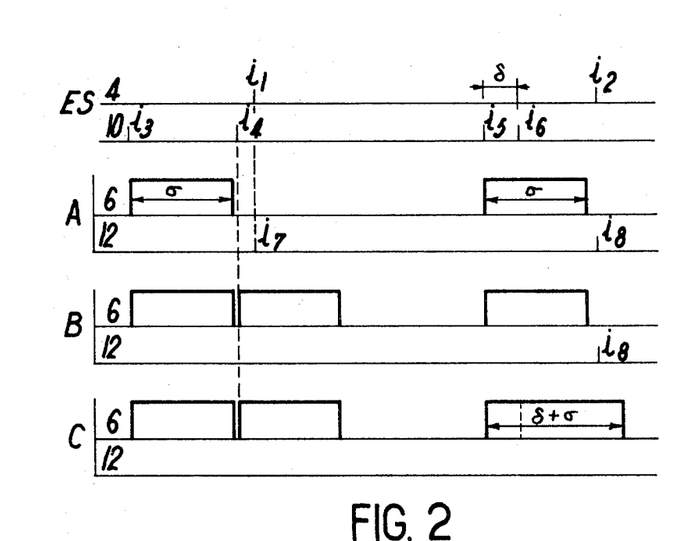
FIG. 2 provides an explanatory illustration of the different modes of operation of the assembly of FIG. 1 according to the nature of the shaping circuit.

The lines 4 and 10 show the pulses which are applied to the two circuits 2 and 8 during two successive sequences. The lines marked 6 and 12 indicate the pulses which appear at the two outputs.

In the case of the conventional shaping circuit (lines A), the pulse $i_1$ which is applied to the input 4 during the first sequence occurs after two pulses $i_3$ and $i_4$ which are applied to the input 10 of the shaping circuit; $i_1$ is separated from pulse $i_3$ by a time interval which is greater than the duration $\sigma$ of the signal delivered by the shaping circuit and from $i_4$ by a time interval which is shorter than $\sigma$. The same applies during the second sequence. However, it will be observed that, during the first sequence, the pulses $i_3$ and $i_4$ which are applied to the shaping circuit are separated by a time interval which is scarcely greater than the duration $\sigma$ of the shaped pulse whilst the pulses $i_5$, $i_6$ which are applied to the same circuit during the second sequence are separated in time by an interval which is distinctly shorter than the duration $\sigma$.

In the first case (line A) and so far as the first sequence is concerned, a pulse having a duration $\sigma$ which is produced by the shaping circuit 8 corresponds to the pulse $i_3$ whilst the pulse $i_4$ which is delivered during the dead time by the shaping circuit is not detected by the circuit.

As a consequence, a pulse $i_7$ appears undesirably at the output 12 of the apparatus. In the case of the second sequence, inasmuch as the pulses $i_5$ and $i_6$ are too compressed to be distinguished by the shaping circuit, the circuit erroneously permits the passage of a pulse $i_8$ corresponding to $i_2$.

In the second case (lines B) and during the first sequence, the circuit 8 which has a zero recovery time, provides a second pulse of length $\alpha$: pulse $i_4$ is detected by the shaping circuit as well as pulse $i_3$. No pulse corresponding to $i_2$ therefore appears but, during the second sequence, the two pulses $i_5$ and $i_6$ are again detected as coincident by the shaping circuit and a pulse $i_8$ is erroneously developed.

So far as concerns the renewable duration pulse-shaping circuit (case C), this circuit operates in the same satisfactory manner as the preceding assembly during the first sequence. During the second sequence that the shaping circuit produces a pulse having a duration $\delta+\sigma$ which is the sum of the interval between the pulses $i_5$, $i_6$ and of the duration $\sigma$ of a signal corresponding to a single pulse. No pulse corresponding to $i_2$ therefore appears. This third circuit is the only circuit arrangement which is satisfactory.

Figure 3:
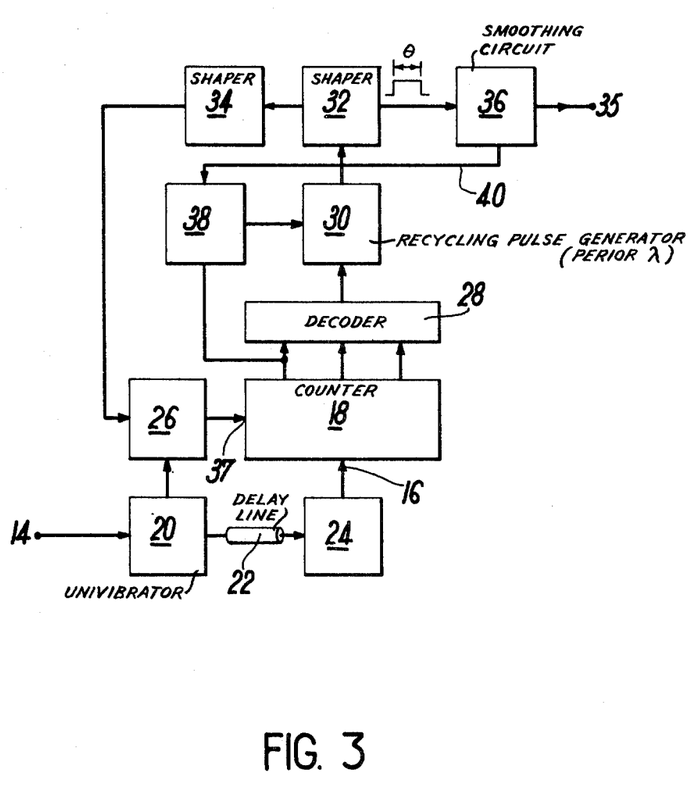
FIG. 3 shows a shaping circuit according to the invention.

The diagram of FIG. 3 represents a renewable duration pulse-shaping circuit in accordance with the invention. The incident pulses are applied to the input terminal 14 from which they are transmitted to the reset input 16 of a counter 18 comprising $n$ flip-flops ($n=3$ in the case which is illustrated). The pulses are transmitted to said counter via monostable multivibrator 20, a delay device 22 and a monostable multivibrator 24. It will be noted that the first multivibrator 20 blocks a normally conducting gate 26. The time of blocking of the gate has a duration "2" $\rho$ which is equal to double the value of the time delay produced by the device 22. Each flip-flop of the counter 18 is coupled to a decoding device 28 and this latter is adapted to actuate a periodic pulse generator 30. The pulses produced by said generator are shaped by an adjustable device 32 having a negligible recovery time and providing pulses of length $\theta$ prior to being transmitted to the output 35 via a smoothing circuit 36. In order to determine the duration of the shaped signal, the pulses produced by the pulse generator 30 are transmitted to the input 37 of the counter 18 by way of the shaping device 32, the short duration pulse-shaping device 34 and by way of the gate 26.

It may be seen that said short duration pulse-shaping circuit 34 could be driven directly by the signals produced by the generator 30. In actual practice, as will be studied hereinafter, said generator is capable of recycling pairs of pulses separated in time by an interval which is shorter than $\theta$, whereupon the scaler is caused to advance at twice the speed. In order to circumvent this problem, the pulses of the generator are filtered by the variable shaping device 32 which imposes its own period.

The desire to improve the operation of the circuit of FIG. 3 leads to the use of a smoothing circuit 36 as has already been noted. The shaping circuit 32 delivers rectangular pulses having a duration $\theta$ which is slightly shorter than the repetition period $\lambda$ of the generator and the smoothing circuit 36 lengthens the pulses which are derived from the device 32 by the duration $\omega$ wherein $\omega=\lambda-\theta$ in order that a single rectangular pulse be delivered responsive to successive pulses of shaper 32.

In order to ensure the operation of the circuit when an input pulse is transmitted to the terminal 14 and when all the flip-flops of the counter 18 are not in state "1", use is made of an integrator 38 which receives the voltage appearing at the output of the first flip-flop of the counter and initiates the operation of the generator 30 when the amplitude of the output voltage of the integrator 38 oversteps a predetermined threshold.

It is necessary to prevent untimely transmissions of trigger pulses from the integrator 38 to the generator 30. With this object in mind, a feedback channel 40 couples the smoothing circuit 36 with said integrator. The function of said channel is to inhibit the operation of the integrator when the smoothing circuit produces an output pulse.

Figure 4:
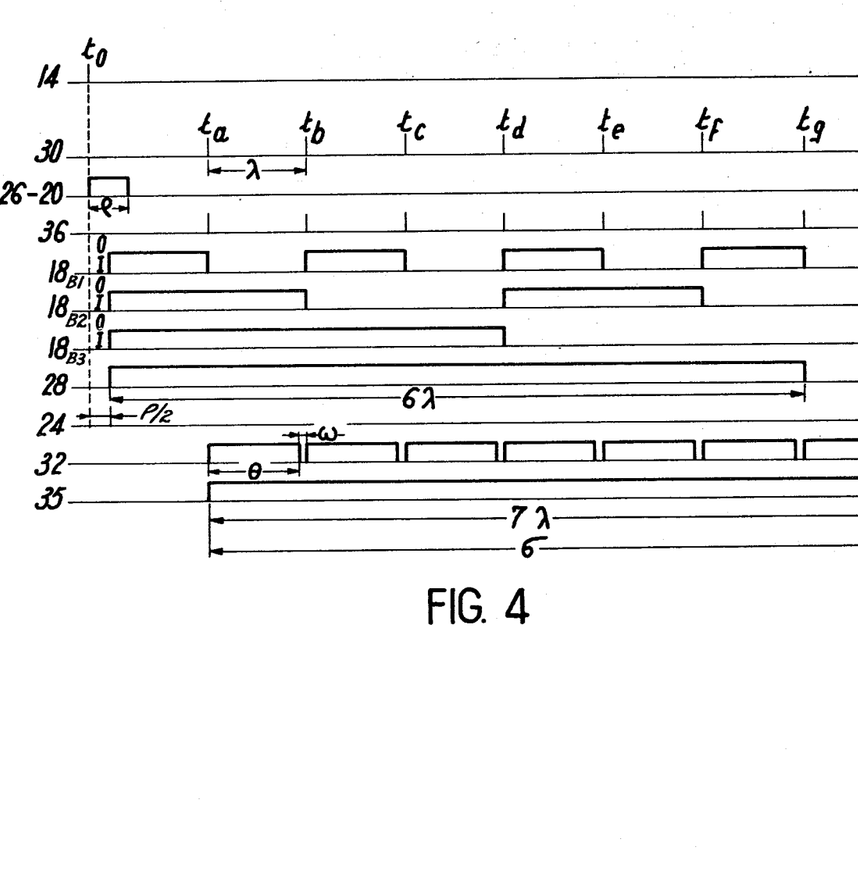
FIG. 4 provides an explanatory illustration of the circuit of FIG. 3 and shows the voltages which are developed at different points of said circuit.

The operation of the apparatus which is illustrated in the accompanying drawings will now be explained. When an incident pulse is applied at 14, the flip-flops of the counter register in principle a "1" if the apparatus was previously at rest. Said incident pulse actuates the monostable multivibrator 20 which blocks the gate 26 (as shown in FIG. 4, lines 20—26) for a time $\rho$ whilst the second multivibrator 24 applies a pulse (line 24) to the input 16 of the counter and resets each flip-flop to zero (lines 18 $B_1$, 18 $B_2$, 18 $B_3$). As a result of the blocking of gate 26 for a time $\rho$ and delaying the pulse by delay $\rho/2$, it can be ensured that the flip-flops are reset to zero at a moment when no switching action can take place within the counter, the duration of the pulses produced by the multivibrator 24 being shorter than the time $\rho$ of closure of the gate and also shorter than the delay $\rho 2$ which is due to the device 22.

The simultaneous resetting of the flip-flops of the counter 18 has the effect of generating at the output of the decoding circuit 28 a signal which has a sufficient amplitude to trigger the recycling generator 30. The period $\lambda$ of operation of the generator 30 (line 30) is adjustable by means of an open cable. Said generator in turn initiates the operation of the shaping circuit 32 (line 32) and this latter produces rectangular pulses having a duration $\theta<\lambda$ as has already been explained. Said duration can also be adjusted by means of a short-circuited cable.

When the flip-flops of the counter 18 have received seven successive pulses ($n=3$) from the periodic pulse generator 30 and in the initial condition all flip-flops were reset, the generator 30 no longer receives a voltage from the decoding circuit 28. Consequently, the generator stops.

If two input pulses are applied in succession to a renewable duration shaping circuit in accordance with the invention, the different modes of operation must be studied separately.

1. In general, if a second pulse appears at the input 14 during the process hereinabove described, the flip-flops of the counter are all reset to zero and the recycling generator 30 must once again deliver seven additional pulses before stopping. It should be pointed out that, in this case, the flip-flops are not all reset, so that said generator does not regenerate a further pulse but continues to recycle the initial pulse. The presence of the gate 26 prevents any pulse emitted by the generator 20 from disturbing any subsequent resetting.

Figure 5:
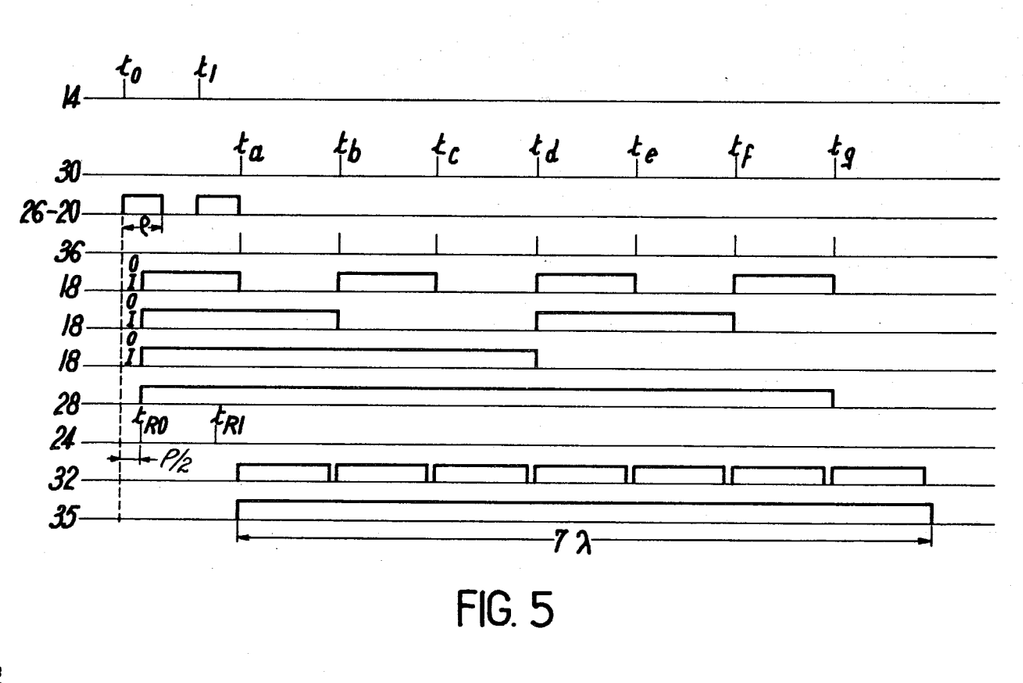
FIGS. 5 and 6 relate to the operation of the circuit of FIG. 3 when this latter receives a second incident pulse prior to the emission of the first pulse by the periodic pulse generator.

2. A few special cases will now be examined.

a. It will first be assumed (FIG. 5) that the time of occurrence of the second pulse $t_1$ takes place after the first pulse $t_0$ ($t_0 < t_1$) but sufficiently soon for the gate circuit 26 to be unblocked prior to the emission of the first pulse produced by the generator 30. Therefore we may write:

$$t_0 < t_1 < t_a - \rho$$

Figure 6:
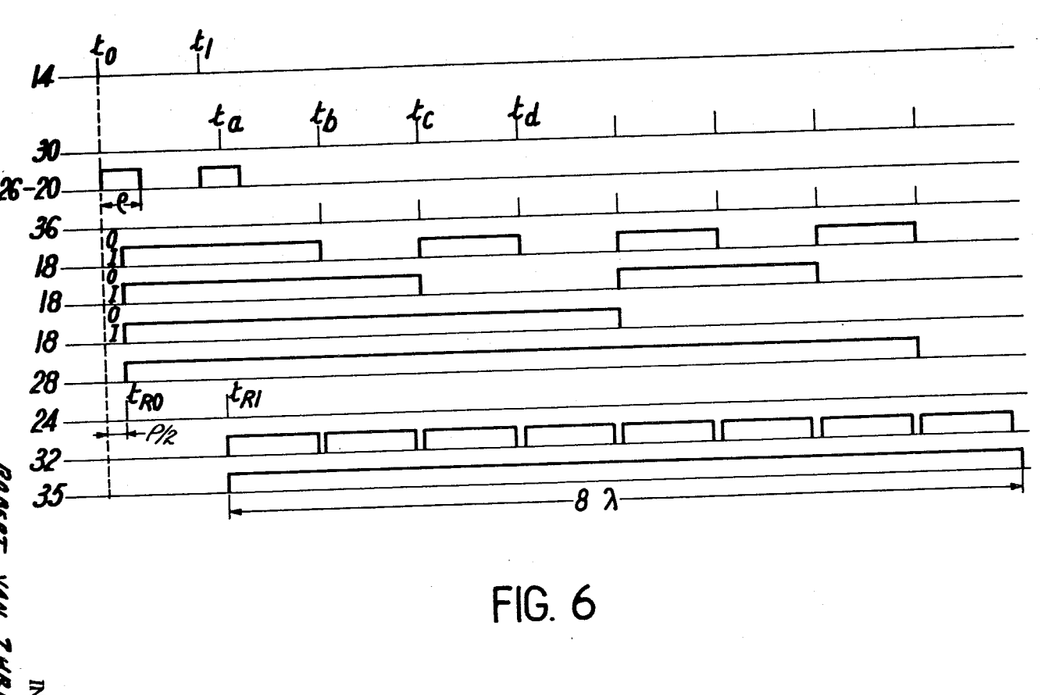

The diagram (FIG. 5) shows that the second pulse $t_1$ is not detected if it is applied to the resetting element 16 whilst all the flip-flops mark zero.

b. If the second input pulse appears after the initial pulse and too late to permit the gate circuit 26 to open again prior to the occurrence of the first pulse $t_a$ of the generator (FIG. 6), said pulse does not reach the first flip-flop of the counter and the device is unresponsive to pulse. Under these conditions, the output signal has a duration of 8λ instead of 7. The instant of occurrence of the pulse $t_1$ is defined by the following double inequation:

$$t_a > t_1 > t_a - \rho$$

c. When the second input pulse $t_1$ is comprised between the first pulse ($t_a$) of the generator and the second pulse ($t_b$), two different types of operation take place according to the time of arrival of said second incident pulse $t_1$. One of these operations is illustrated in FIG. 6.

Figure 7:
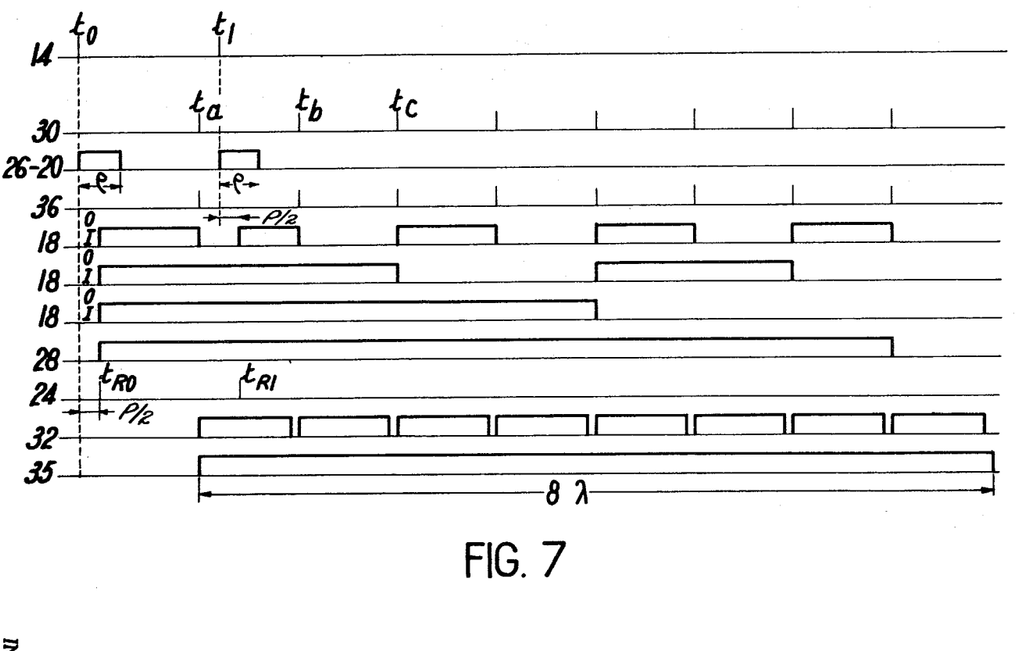
FIG. 7 relates to the case in which the circuit of FIG. 3 receives a second input pulse after the emission of the first pulse of the periodic generator but prior to the emission of the second pulse.

In the last two cases envisaged, the output signal has a duration of 8λ as in the previous case (b). The circuit herein described therefore takes into account the pulse $t_1$, but according to two modes of operation. In the case which is illustrated in FIG. 7, $t_a$ reaches the counter 18 but $t_1$ resets the counter to the zero state after the production of a pulse by the multivibrator 24; as a consequence, seven additional pulses will be required in order to restore all the flip-flops to state "1."

From the three conditions of operation which have just been examined, the following points may be deduced:

(i). $\tau = t_a(t_0 + \rho) = t_t - \rho$ the notation $t_t$ being the transit time, that is to say the time interval which elapses between the arrival of an input pulse and the closure of the gate 26. The condition $\rho$ τ must also be complied with.

The condition just mentioned can be satisfied by constructing the monostable multivibrator 20 by means of a zero-overlap shaping circuit and by imposing the second condition:

$$\rho > 2t_p + t_0$$

$t_p$ being the time of maximum propagation of a change of state of the counter.

In short, we must have $t_{t/}2 \geq \rho \geq 2t_p + t_i$ ii. a study of the diagrams of FIGS. 3, 4, 5 and 6 shows that, depending on the mode of operation of the circuit, the duration of its output signal varies in discrete values by:

$$\sigma/(2-1), (\sigma \text{ being as shown in FIG. 4})$$

that is to say:

$\sigma/7$ in the particular case which is illustrated.

d. Consideration will now be given to the case in which the pulse $t_1$ (the second input pulse) appears at the input 14 at an instant which is relatively close to and before the end of a normal pulse produced by the circuit of FIG. 3. It will be assumed that $t_1 = t_a + \theta t_t - \epsilon$. In this expression, $t_1$ and $\theta$ have the same meaning as above, $t_a$ is the time of occurrence of the seventh pulse derived from the recycling generator a $t_t$ is equal to the transit time $t_a - t_0$ and $\epsilon$ is a time deviation which is short with respect to $\rho$.

Figure 8:
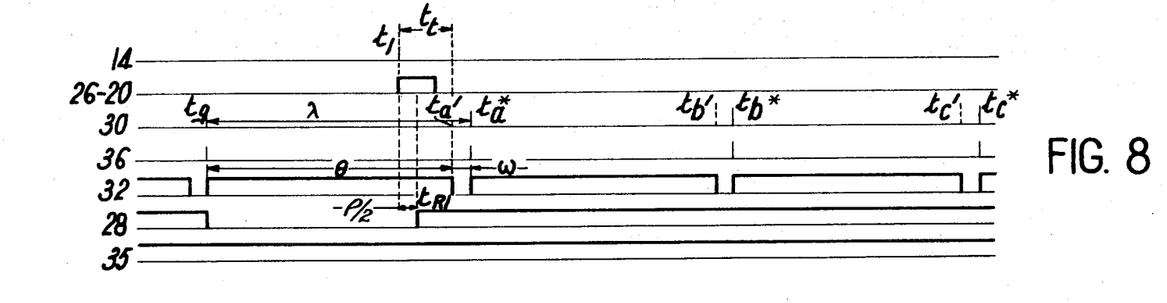
FIGS. 8 and 9 relate to the case in which the circuit of FIG. 3 receives a second input pulse a short time before the normal time duration of the rectangular pulse produced by said circuit has elapsed, the resolving time of the generator being zero or shorter than $\lambda - \theta$.
Figure 9:
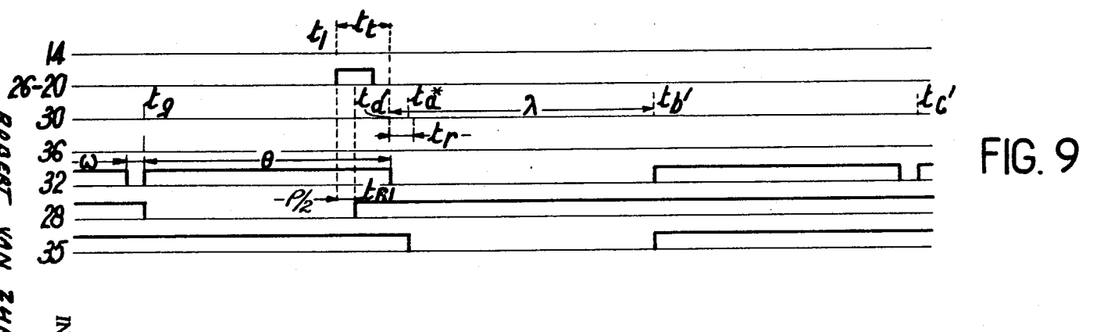

The modes of operation are accordingly illustrated by FIGS. 8 and 9.

It will first be assumed that the resolving time of the recycling generator 30 is substantially zero ($t_r = 0$), FIG. 8. If no pulse arrives at the instant $t_1$, a pulse having the reference $t_a^*$ which is produced by the generator would arrive at an instant $t_a + \lambda$. In this case, said pulse would not be recycled inasmuch as all the flip-flops of the counter 18 are in state "1."

If a pulse should arrive at the time $t_1$, the flip-flops are reset to the zero state and the recycling generator then regenerates pairs of pulses ($t'_a$, $t_a - t'_b$, $t_b$...) which have as their origin $t_o$ and $t_1$. Inasmuch as the variable shaping device 32 has a normal period of operation equal to $\theta$ and taking into account the instant of arrival of $t_1$, the circuit 32 cannot be triggered at the instant $t_a$ and will therefore continue to be triggered by the pulse which appeared initially at the instant $t_o$.

Under these conditions, the operation is correct and no interruption of the output signal takes place.

If the resolving time $t_r$ of the recycling generator is longer than ω (FIG. 9, lines 30 and 32), the same does not apply. In point of fact, the circuit 32 cannot be triggered in this case at the instant $t_a$ inasmuch as this circuit is still in the operating period; in addition, at the time $t_a^*$, the pulse which normally follows the pulse which has arrived at the time $t_a$ appears in this case during the dead time of the generator which has just been triggered by the pulse which arrives at the time $t'_a$.

It is accordingly obvious that the condition $t_r < \omega$ must be satisfied in order to ensure correct operation.

There now follows a description of one application of the circuit in accordance with the invention. This circuit produces an output pulse corresponding to an incident pulse only in the case in which this latter is preceded and followed by a free time interval at least equal to $\rho$.

It has already been explained that this type of circuit has the following evident property: it produces a pulse having a duration Δ each time it receives an incident pulse and each time it has not received such a pulse since an identical time duration Δ and whenever said pulse is not followed by another pulse which is separated from the first by a time interval having a duration which is shorter than the predetermined duration Δ.

Figure 10:
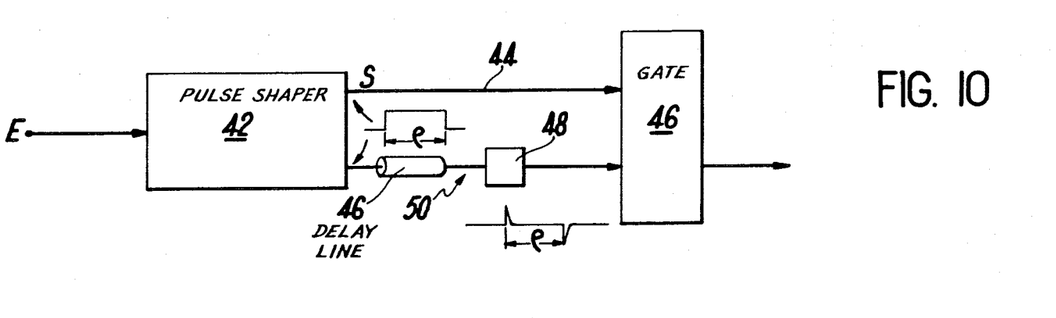
FIG. 10 is a schematic diagram showing an assembly which makes use of the renewable duration variable pulse-shaping circuit in accordance with the invention. Said circuit makes it possible to produce an output pulse only if an input pulse has been preceded and followed by a free time interval which is either equal to or longer than a predetermined duration.

The property which has just been referred to can be embodied in a logic assembly (as shown in FIG. 10) which makes use of the renewable duration pulse-shaping circuit of the invention.

The pulse problems which are encountered in nuclear spectrometry can thus be solved in a simple manner by means of a junction detector as well as by means of a scintillation counter. Although the characteristics set forth hereinabove are not new and applications in the millisecond range are already known, such shaping operations are at present unknown in the case of high-count rates. This mode of operation is frequent in the case of anticoincidence devices which are associated with accelerators.

The assembly of FIG. 10 comprises essentially a renewable duration pulse-shaping circuit 42 which supplies two channels. One of said channels 44 connects the circuit 42 directly to the control input of a gate 46 whilst the other channel 50 is constituted by a delay device 46 which transmits the signals applied thereto after a time delay equal to $\rho + \epsilon$ as well as by a differentiator 48 and is connected to the input of said gate. The four lines E42, S42, S48 and S46 (FIG. 11) of the diagram which is shown in the figure represent respectively the pulses applied to the input of the circuit 42, the rectangular pulses which appear at the outputs of said circuit, the pulses which appear at the output of the differentiator 48 and the single pulse which is transmitted by the gate 46.

Figure 11:
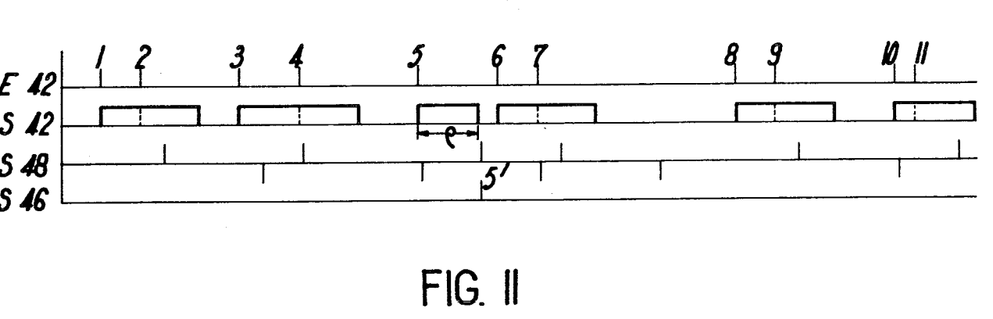
FIG. 11 shows the voltage which appears at different points of the circuit of FIG. 10.

It is apparent from a study of the diagram that only the fifth input pulse is preceded and followed by a free time interval which is longer than or equal to $\rho$ and therefore corresponds thereto a pulse which appears at the output of the gate circuit.

I claim:

1. A method of pulse forming in response to receipt of input pulses comprising the steps of generating successive pulses, counting said generated pulses, stopping generation of said successive pulses when the count of said generated pulses reaches a given value, resetting to zero the count of said generated pulses each time an input pulse is received, and generating a rectangular pulse having a duration determined by the number of successive pulses generated.

2. A pulse-forming circuit comprising a counter including resetting means for resetting said counter, a pulse generator connected to said counter for advancing said counter, decoder means responsive to said counter for maintaining operation of said pulse generator until said counter reaches a predetermined count, output means responsive to successive pulses from said pulse generator for providing a single rectangular pulse having a duration determined by the number of said successive pulses, and control means responsive to receipt of an input pulse for blocking the connection from said pulse generator to said counter for a given period subsequent to receipt of said input pulse and for actuating said resetting means.

3. A pulse-forming circuit as defined in claim 2, wherein said control means includes a first monostable multivibrator which is triggered by said input pulse and a normally conducting gate which couples said pulse generator to said counter, said gate being blockable by the output of said first monostable multivibrator for said given period.

4. A pulse-forming circuit as defined in claim 3, wherein said control means further includes a delay device connected to the output of said first monostable multivibrator providing a delay equal to approximately one-half said given period, and said resetting means includes a second monostable multivibrator having its input connected to said delay device and its output connected to a reset input of said counter.

5. A pulse forming circuit as defined in claim 2, wherein said output means includes variable shaping means connected to the output of said pulse generator for producing pulses having a duration slightly shorter than the period of the pulses produced by said pulse generator and a smoothing circuit connected to the output of said variable shaping means for producing said rectangular pulse.

6. A pulse-forming circuit as defined in claim 5, wherein said variable shaping means includes a circuit having a zero recovery time controlled by said pulse generator and a short duration pulse-shaping device having its output applied to the input of said counter.

7. A pulse-forming circuit as defined in claim 6, further including integrating means connected from the output of said counter to said pulse generator for initiating the operation of said pulse generator when the output voltage of said counter exceeds a predetermined threshold.

8. A pulse-forming circuit as defined in claim 7, wherein a feedback channel is provided from said short duration pulse-shaping device to said integrating means for inhibiting said integrating means when a rectangular pulse is being generated thereby.

9. A pulse-forming circuit as defined in claim 4, wherein said output means includes variable shaping means connected to the output of said pulse generator for producing pulses having a duration slightly shorter than the period of the pulses produced by said pulse generator and a smoothing circuit connected to the output of said variable shaping means for producing said rectangular pulse.

10. A pulse forming circuit as defined in claim 2, further including integrating means connected from the output of said counter to said pulse generator for initiating the operation of said pulse generator when the output voltage of said counter exceeds a predetermined threshold.